United States Patent Office 3,080,434
Patented Mar. 5, 1963

3,080,434
PROCESS FOR PRODUCING AROMATIC
COMPOUNDS BY PYROLYSIS
Raymond C. Odioso, Glenshaw, Pa., and Kenneth J. Frech, Kent, Ohio, assignors to Gulf Research & Development Company, Pittsburgh, Pa., a corporation of Delaware
No Drawing. Filed Dec. 17, 1958, Ser. No. 780,943
2 Claims. (Cl. 260—670)

This invention relates to a process for the synthesis of aromatic compounds consisting of at least two distinct ring systems wherein the ring systems [whether single or polynuclear (condensed or uncondensed)] are connected to one another, preferably via a substituent group, and more particularly to the synthesis of bibenzyl.

The starting material which can be employed in the synthesis of the aromatic compounds described above are substituted aromatic compounds selected from the group consisting of alkyl or substituted alkyl aromatics and amine or substituted amine aromatics and are characterized in general by the following structural relationship:

XY wherein X can be an aromatic radical of phenyl, indenyl, furanyl, pyrazyl, thiophenyl, benzofuranyl, thionaphthenyl, decalyl, etc.; and Y can be an alkyl radical having, for example, from one to 16 carbon atoms, such as methyl, ethyl, isopropyl, normal butyl, isobutyl, normal pentyl, isopentyl, normal hexyl, isohexyl dodecyl cetyl, etc.; $NH_2$; —NHR, wherein R can be

X as defined above, or substituted derivatives thereof, or an alkyl radical having from one to 16 carbon atoms, such as methyl, ethyl, isobutyl, hexyl, cetyl, etc.;

wherein R and $R_1$ can be the same or different, but similar to R immediately above. Similarly Y can be $CH_2A$, where A can be

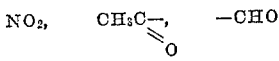

phenyl, a substituted phenyl, etc. The substituent Y can be located on any available position on the aromatic ring. Examples of compounds which can be used include toluene, o,m,p-xylene, mesitylene, durene, isodurene, hexamethylbenzene, aniline, methylaniline, acetanilide, indene, methylthiophene, quinaldine, methylpyrazine, methylfuran, methylpyrolle, methylpyridine, α and β-methylnaphthalene, methylbenzofuran, methylthianaphthene, methyldecahydronaphthalene, etc.

The aromatic compounds defined above can be used in admixture with each other but preferably are employed alone as the charge stock for the process of this invention. The charge stock is treated at an extremely high temperature, a low pressure and a carefully controlled contact time. The temperature must be sufficiently high to allow rupture between a terminal carbon on the substituent forming a part of the starting material and an adjacent hydrogen but not so high that coke formation is the predominant reaction. For example, in the case wherein toluene is the starting material, the temperature must be sufficiently high to cause rupture between the carbon on the methyl substituent and one of the hydrogens attached thereto. The benzyl thus obtained combines with another benzyl radical similarly obtained and bibenzyl is immediately formed. Thus it is absolutely necessary in the practice of this invention to pass the charge through a reaction zone maintained at a temperature of at least about 800°, preferably about 900° to about 1200° C. The charge to the reaction zone can be preheated to any temperature below which thermal cracking of the charge is initiated. Although the threshold cracking temperature will vary with the charge stock employed, the preferred range of temperature will be in the range of about 20° to about 400° C. The pressure must be sufficiently low to permit and accelerate the rupture defined above and the inter molecular recombination to occur. Therefore a pressure of at least about 0.1 mm. Hg absolute, preferably from about 0.1 mm. Hg absolute to about atmospheric will suffice.

Extremely critical in the practice of this invention is the contact time. We have found that in order to obtain a high conversion of the charge or starting material to the product aromatic compound it is absolutely necessary that the starting material hereinabove defined be maintained at the selected temperature for about 0.001 to about 0.015, preferably about 0.005 to about 0.008, second.

The process of this invention can further be illustrated by reference to the following examples.

*Example I*

0.2601 mole of toluene, which was at 30° C. and 0.6 mm. Hg absolute, was passed through a reactor maintained at a temperature of 850° C. at such a rate that a contact time of 0.006 second was achieved. The products obtained were analyzed by mass spectrometric and infrared procedures, and found to contain 0.0018 mole of bibenzyl, 0.256 mole of toluene, 0.0006 mole of xylene, and no benzene. Efficiency of conversion to bibenzyl was therefore 85.8 percent.

*Example II*

Again 0.3420 mole of toluene, which was at 30° C. and 0.9 mm. Hg absolute, was passed through a reactor maintained at a temperature of 1000° C. at such a rate that a contact time of 0.0065 second was achieved. The product was found to contain 0.0047 mole of bibenzyl, 0.3286 mole of toluene, 0.0003 mole of styrene, 0.0017 mole of xylenes and 0.0020 mole of benzene. Efficiency of conversion to bibenzyl thus was 70.1 percent.

*Example III*

Similarly 0.3858 mole of toluene, which was at 30° C. and 1.1 mm. Hg absolute, was passed through a reactor maintained at a temperature of 925° C. at such a rate that a contact time of 0.0084 second was achieved. The product obtained was found to contain 0.0032 mole of bibenzyl, 0.3775 mole of toluene, 0.0015 mole of xylenes and 0.0004 mole of benzene. Efficiency of conversion to bibenzyl thus was 77.2.

*Example IV*

0.3381 mole of toluene, which was at 30° C. and 0.8 mm. Hg absolute, was passed through a reactor maintained at a temperature of 850° C. at such a rate that a contact time of 0.0095 second was achieved. Obtained in the reaction product were 0.0016 mole of bibenzyl, 0.3339 mole of toluene, 0.0007 mole of xylenes and 0.0003 mole of benzene. The efficiency of conversion to bibenzyl was therefore 76.2.

*Example V*

Again 0.1961 mole of toluene, which was at 30° C. and 1.0 mm. Hg absolute, was passed through a reactor maintained at a temperature of 925° C. at such a rate that a contact time of 0.0138 second was achieved. The product obtained was found to have present 0.0013 mole of bibenzyl, 0.1921 mole of toluene, 0.002 mole of xylenes and 0.0010 mole of benzene. Efficiency of conversion to bibenzyl was therefore 65.0.

*Example VI*

Similarly 0.1126 mole of toluene, which was at 30° C. and 2.5 mm. Hg absolute, was passed through a reactor maintained at a temperature of 1000° C. at such a rate that a contact time of 0.0435 second was achieved. In the product obtained was found 0.0013 mole of bibenzyl, 0.0896 mole of toluene, 0.0016 mole of styrene, 0.0010 mole of xylenes and 0.0133 mole of benzene. Efficiency of conversion to bibenzyl was thus only 11.3.

The criticality of contact time in the practice of our invention is apparent from the above examples. Note that as long as the contact time was maintained below 0.014 second, the efficiency of conversion to bibenzyl was high. In fact the lower the contact time the greater the efficiency. When the contact time was raised above 0.014 second, the efficiency of conversion was reduced drastically.

While we have shown above the formation of bibenzyl using toluene as starting material, we can substitute any of the other compounds defined above as starting material in place of toluene to obtain the desired compounds. Examples of compounds which can be obtained from the starting materials defined hereinabove are bibenzyl, 1,2-ditolylethane, 1,2-dixylylethane, 1,2-dimesitylethane, 1,1,2,2-tetramethyl-1,2-diphenylethane, hydrazobenzene, 4,4'-diethylbibenzyl, 1,2-dithiophenylethane, 1,2-dipyridylethane, 1,2-difuranylethane, 1,2-dinaphthylethane, 1,2-dipyrazylethane, hydrazotoluenes, etc.

The aromatic compounds obtained in the process can be used as heat exchange media, lubricating oils, chemical intermediates, etc. Bibenzyl, for example, can be treated in accordance with the process disclosed and claimed in our copending application Serial No. 780,949, filed concurrently herewith to obtain styrene and benzene.

Obviously, many modifications and variations of the invention, as hereinabove set forth, can be made without departing from the spirit and scope thereof, and therefore only such limitations should be imposed as are indicated in the appended claims.

We claim:
1. A process for producing aromatic compounds which comprises passing toluene through a reaction zone maintained at a temperature of about 800° to about 1200° C. at such a rate that a contact time of about 0.001 to about 0.015 second is achieved.
2. A process for producing aromatic compounds which comprises passing toluene through a reaction zone maintained at a temperature of about 900° to about 1200° C. at such a rate that a contact time of about 0.005 to about 0.008 second is achieved.

References Cited in the file of this patent

UNITED STATES PATENTS

| | | |
|---|---|---|
| 1,925,784 | Williams | Sept. 5, 1933 |
| 2,180,814 | Mattox et al. | Nov. 21, 1939 |
| 2,208,517 | Prutton | June 16, 1940 |
| 2,767,057 | Kennedy | Oct. 16, 1956 |

FOREIGN PATENTS

| | | |
|---|---|---|
| 581,046 | Germany | July 6, 1933 |
| 768,122 | Great Britain | Feb. 3, 1957 |

OTHER REFERENCES

Szwarc, J. Chem. Phys., 16, pp. 128–136 (1948).

Genco et al.: "The (C—H) Bond Dissociation Energy in the Methyl Group of Toluene," United States Atomic Energy Commission. Publication ISC–746, March 1956 (36 pages).